Patented Oct. 21, 1947

2,429,501

UNITED STATES PATENT OFFICE 2,429,501

PREPARATION OF ALICYCLIC ALDEHYDES

Harry Louis Yale and George W. Hearne, Berkeley, Calif., assignors to Shell Development Company, San Francisco, Calif., a corporation of Delaware No Drawing. Application February 28, 1944, Serial No. 524,312

9 Claims. (Cl. 260—598)

This invention relates to the production of alicyclic aldehydes from cyclic olefins. More particularly, the invention relates to a method for preparing alicyclic aldehydes which comprises reacting a cyclic non-tertiary olefin containing more than five carbon atoms in its ring structure with an oxygen-containing mercuric salt.

It has been found that cyclic non-tertiary olefins having more than five nuclear carbon atoms may be converted economically and in good yields to hitherto relatively unavailable alicyclic aldehydes which are useful as solvents and in the synthesis of other organic compounds by a process which comprises oxidizing the said olefins with an oxygen-containing mercuric salt. The reaction which takes place leads to the formation of an alicyclic aldehyde containing one less carbon atom in the ring than was present in the cyclic structure of the olefin employed as a starting material. It may be represented by the following equation in which cyclohexene is used as a representative cyclic olefin:

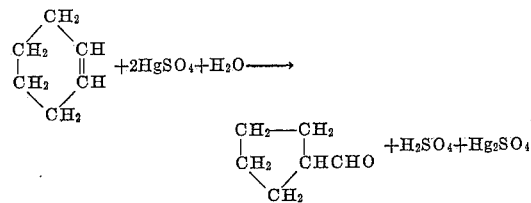

Although the above represents the net reaction occurring when a cyclic olefin, e. g., cyclohexene, is treated with a reagent comprising mercuric sulfate and water under suitable conditions of operation, it appears that the reaction occurs in two steps, in the first of which the mercuric sulfate reacts with the cyclic olefin to form an olefin-mercuric sulfate complex. This complex is then broken down under the conditions of the reaction to form an alicyclic aldehyde, sulfuric acid and mercurous sulfate. In the case of cyclohexene, the reactions for these steps may be represented as follows:

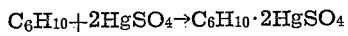
$C_6H_{10} + 2HgSO_4 \rightarrow C_6H_{10} \cdot 2HgSO_4$

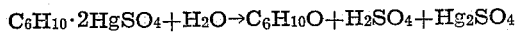
$C_6H_{10} \cdot 2HgSO_4 + H_2O \rightarrow C_6H_{10}O + H_2SO_4 + Hg_2SO_4$ It is therefore possible to carry out the process of the invention as either a single-stage or a two-stage operation. In the single-stage mode of operation, the olefin may be reacted with the oxygen-containing mercuric salt under conditions such that the olefin-mercuric salt complex is decomposed to form an aldehyde and a mercurous salt substantialy as soon as it is formed. This may be accomplished, for example, by carrying out the reaction at a temperature which is at or above the decomposition temperature of the said olefin-mercuric salt complex. In this embodiment of the invention a quantity of olefin may be passed into or contacted with a solution or suspension of an oxygen-containing mercuric salt contained in a suitable reaction chamber at a temperature which is approximately the boiling or reflux temperature of the said solution, the aldehyde product being separated by suitable means from the vapors leaving the said reaction chamber. Better yields and a superior product are obtained in most cases, however, when the process is carried out in two stages. When employing the two-stage mode of operation, a quantity of olefin or of olefin-containing gas or vapor may be contacted with a neutral or acid solution of an oxygen-containing mercuric compound contained in a suitable reaction vessel, the temperature being maintained at a level which is substantially below the decomposition temperature of the olefin-mercuric compound complex. When the desired amount of the said oxygen-containing mercuric compound has been converted to the complex, an oxygen-containing acid may be added, if desired, and the temperature of the reaction mixture raised to a temperature which is above the decomposition temperature of the complex, thereby effecting its decomposition and forming an aldehyde and an oxygen-containing mercurous compound. The aldehyde product may then be separated from the reaction mixture by any desired means, as by distillation.

The above-described procedure may be carried out in a batch, intermittent or continuous manner. When a batch operation is desired the olefin may be added to the oxygen-containing mercuric compound contained in a suitable reaction vessel in substantially the same fashion as described above. When operating as a continuous process, however, a stream of olefin or of olefin-containing gas may be continuously passed concurrently or countercurrently to a stream of the oxygen-containing-mercuric-salt reagent in a suiable reaction chamber or absorption tower. In single-stage operation the reaction may be carried out in the presence of an oxygen-containing acid and at a temperature which is sufficiently high to effect the decomposition of the olefin-mercuric salt complex substantially as soon as it is formed. The aldehyde product may then be continuously withdrawn from the reactor and purified by distillation, while the mercurous compound which is formed together with the aldehyde by the decomposition of the said complex may be continuously withdrawn as a sludge, separated from the acid, decomposition products, etc., with which it may be contaminated and reconverted by suitable means to the oxygen-containing mercuric compound which is used as a starting material. The mercuric compound as well as any unreacted olefin which may be recovered from the reaction chamber may be added to the fresh feed and recycled.

When carrying out the reaction continuously in two stages, the olefin may be continuously contacted with the mercuric salt-containing reagent at a temperature at which the olefin-mercuric salt complex is stable. This step may be carried out with or without the addition of oxygen-containing acid. The mixture containing the olefin-mercuric salt complex may then be passed continuously into a second reactor where an acid may be added, if desired, and the decomposition of the complex effected by heating the mixture to a temperature which is equal to or greater than the decomposition temperature of the said complex. The resulting aldehyde and mercurous-salt-containing sludge may be separately withdrawn from the reaction chamber and recovered as indicated hereinabove.

A preferred method of executing the process of the invention may be illustrated by that which may be employed in oxidizing cyclohexene to cyclopentane carboxaldehyde. In accordance with this manner of operation a quantity of cyclohexene may be contacted with a mixture of aqueous sulfuric acid and mercuric sulfate at a temperature of from about 20° C. to about 70° C., preferably between about 55° C. and about 65° C. When the mercuric sulfate content of the solution has been substantially completely converted to the cyclohexene-mercuric sulfate complex, as indicated by the characteristic color change of the reaction mixture, the temperature may be increased to about 100° C., thereby effecting the decomposition of the olefin-mercuric sulfate complex and forming cyclopentane carboxaldehyde and mercurous sulfate. The cyclopentane carboxaldehyde may then be separated from the mixture by any suitable means, as by distillation.

The process of the invention may be applied with suitable modifications to the oxidation of a variety of cyclic olefins. Suitable olefins are, in general, the unsubstituted or suitably substituted cyclic, non-tertiary olefins having more than five carbon atoms in their cyclic structures. A preferred group of non-tertiary cyclic olefins which may be converted to alicyclic aldehydes with particular effectiveness by the process of the present invention comprises those having a six-membered carbon ring structure which contains a non-tertiary olefinic linkage. The said six-membered ring may be substituted on the non-olefinic carbon atoms with non-interfering substituent groups such as, for example, the alkyl, aryl, alkoxy, aryloxy, ester, hydroxyl, carbonyl or halogen groups. The six-membered ring containing the non-tertiary olefin group may also be a unit of a fused ring system such as is found in octahydronaphthalene. Representative olefins which may be converted to alicyclic aldehydes by the process of the invention are therefore cyclohexene, 3-methylcyclohexene, 4-methylcyclohexene, 3,4-dimethylcyclohexene, 3,4,5-trimethylcyclohexene, 3,3,4-trimethylcyclohexene, 3,3,5-trimethylcyclohexene, 3-ethylcyclohexene, 4-phenylcyclohexene, octahydronaphthalene, 3-methyloctahydronaphthalene, cycloheptene, cyclo-octene, and the like. The olefins may be used singly or in combination with each other. They may be used as pure olefins or in admixture with non-interfering substances, e. g., the paraffin hydrocarbons, nitrogen, etc. The process is thus adapted to the utilization of commercial grade cyclic olefins which contain in addition to cyclic olefins substantial amounts of paraffin hydrocarbons.

A variety of mercuric salts may be used in executing the process of the present invention. Suitable salts comprise in general the mercuric salts of the oxygen-containing acids such as sulphuric acid, acetic acid, nitric acid, phosphoric acid and the like. Mercuric sulfate represents a preferred member of this group, although mercuric nitrate, mercuric phosphate, mercuric acetate, mercuric formate, mercuric propionate, mercuric chloro acetate, etc., may also be used. These salts may be used singly or in combination with each other. If desired, they may be prepared in situ by adding an acid to an appropriate mercuric salt such as mercuric oxide or mercuric carbonate, thereby converting the said compound to the desired salt. The amount of mercuric salt to be used is dependent upon the amount of cyclic olefin which it is desired to convert to the corresponding aldehyde. In general, it is preferable to use an amount of mercuric salt which represents an excess of from about 25% to about 50% over that theoretically required to combine with the olefin. As indicated hereinabove, the mercuric salt is converted during the course of the reaction to the corresponding mercurous salt which is recovered as a sludge from the reaction mixture. The mercurous salt content of the said sludge may be converted to the mercuric salt by any one of several methods known heretofore to the prior art. The mercurous salt may be converted to the corresponding mercuric salt, for example, by electrolytic oxidation, by heating with nitric acid, by treating with chlorine gas in the presence of an acid, etc. The re-oxidized mercuric salt may then be used to convert a fresh quantity of olefin to aldehyde.

Although as indicated hereinabove the process of the invention may usually be executed without the addition of an acid to the reaction mixture, it may be desirable in some instances to carry out the reactions, particularly the decomposition of the olefin-mercuric salt addition compound, in a reaction medium to which an acid has been added. If an acid is used, it should be an oxygen-containing acid of sufficient strength to prevent the hydrolysis of the mercuric salt and to effect the decomposition of the olefin-mercuric salt complex under the conditions of the reaction. Suitable acids are the relatively strong oxygen-containing mineral acids such as sulfuric, nitric or phosphoric acid, or, in general, any organic or inorganic oxygen-containing acid of sufficient strength to result in the formation of a reaction medium having a pH of less than about 4. Such acids include acetic acid, bromacetic acid, butyric acid, chloracetic acid, citric acid, formic acid, isobutyric acid, oxalic acid, phosphorous acid, propionic acid, sulfanilic acid, sulfurous acid, valeric acid and the like. These acids may be used singly or in combination with each other and may or may not correspond to the mercuric salt used. The acid may, if desired, be introduced as the acid anhydride and converted to the corresponding acid by reacting it with the water content of the reaction mixture. In many cases sulfuric acid in a concentration of from about 0.1% to about 25.0%, preferably about 0.25% to about 5.0% represents a particularly desirable acid medium in which to carry out the process of the invention.

It is generally preferred to carry out the reaction in aqueous medium. However, if desirable or necessary because of the nature of the reactants used a mutual solvent, e. g., acetone, may be added to promote the solution or absorption of the olefin in the reaction mixture. Suitable solvents are those which will not cause deleterious side reactions to take place and which may be readily separated from the reaction products.

The temperature at which the process is carried out is variable depending upon the nature of the reactants, and upon whether the process is carried out in one or two stages. If carried out as a single-stage process, i. e. one in which the olefin-mercuric salt complex is decomposed substantially as soon as it is formed, the temperature employed may advantageously be a temperature which is approximately the boiling temperature of the reaction mixture. Where the reaction is carried out in aqueous medium at atmospheric pressure, this temperature will be about 100° C. Where, however, the process is carried out in two stages, the temperature of operation of the first stage, i. e., that stage in which the olefin is reacted with the mercuric salt to form an olefin-mercuric salt complex, should be substantially below the decomposition temperature of the said complex. With most olefins a temperature range of between about 20° C. and about 70° C., preferably between about 55° C. and about 65° C., represents a suitable temperature range. After the conversion of the olefin to the olefin-mercuric salt complex is substantially complete, the temperature may be raised in the second stage of the process to a level at which the said complex is unstable and decomposes to form the desired aldehyde together with a quantity of mercurous salt. This is in general a temperature of between about 90° C. and about 105° C., preferably a temperature which is approximately equal to the reflux or boiling temperature of the reaction mixture, e. g., a temperature of about 100° C., when the reaction is carried out in aqueous medium.

The process of the invention may usually be effectively executed at atmospheric pressure. If desired, however, subatmospheric or superatmospheric pressures may be employed. Operating at elevated pressures, i. e., pressures of between about 50 lbs. per sq. in. and about 300 lbs. per sq. in., may be advantageous in some instances, as where it is desired to effect the complete and rapid absorption in the mercuric salt reagent of a particular olefin which is in the gaseous state at the temperature of reaction.

The process may be carried out in any suitable type of apparatus which is adapted to batch or continuous one-stage or two-stage operation and which is provided with suitable means for maintaining the reaction mixture at the desired temperature level. The equipment should be of such a nature as to effect intimate contact between the olefin and the mercuric salt reagent. This may be accomplished in batch operation by bubbling a quantity of the gaseous olefin through the said reagent and in continuous operation by passing a stream of the olefin concurrently or countercurrently to a stream of the said mercuric salt reagent in a suitable absorption tower.

The aldehyde product may be separated from the reaction mixture in any desired manner as by distilling it together with relatively small amounts of water or solvent and subsequently separating the desired aldehyde from the contaminating materials by any suitable means as by fractional distillation, salting out, etc. It may be desirable in many cases to carry out the distillation step in an atmosphere of an inert gas, e. g., nitrogen, to prevent oxidation of the aldehyde product. The mercurous salt, which is usually contaminated with small amounts of free mercury, may be withdrawn as a sludge from the reaction vessel. The mercurous salt may then be converted to the desired mercuric salt as indicated hereinabove.

The process of the invention is illustrated by the following examples in which the amounts of reactants are given in parts by weight.

*Example I*

Eight parts of cyclohexene were contacted with an oxidizing mixture comprising four parts of concentrated sulfuric acid, 300 parts of water and fifty parts of mercuric sulfate. The temperature of the resulting reaction mixture was maintained at about 60° C. until the formation of the cyclohexene-mercuric sulfate addition compound was complete. The temperature was then increased to about 100° C. and the mixture distilled in an atmosphere of nitrogen to separate the cyclopentane carboxaldehyde product.

*Example II*

Trimethylcyclohexene was treated with an oxidizing mixture comprising a sulfuric acid solution of mercuric sulfate in the manner described in Example I. The product in this case was trimethylcylopentane carboxaldehyde.

*Example III*

Cyclohexene was reacted with an oxidizing mixture comprising an aqueous suspension of mercuric sulfate which contained no added acid. The reaction conditions were regulated substantially as described in Example I. Distillation of the reaction mixture resulted in the isolation of cyclopentane carboxaldehyde.

We claim as our invention:

1. A process for the production of cyclopentane carboxaldehyde from cyclohexene which comprises reacting at a temperature of between about 55° C. and about 65° C. the said cyclohexene with mercuric acetate in an acid medium which contains between about 0.5% and about 5.0% of sulfuric acid thereby forming an addition product between the said cyclohexene and the mercuric compounds present in the said acid medium, and subsequently raising the temperature of the said acid medium to a temperature which is approximately its boiling temperature in order to effect the decomposition of the said complex and the formation of cyclopentane carboxaldehyde.

2. A process for oxidizing cyclohexene to cyclopentane carboxaldehyde which comprises forming an intermediate mercury-containing compound by reacting the said cyclohexene at a temperature of between about 55° C. and about 65° C. with mercuric sulfate in an aqueous acid medium containing from about 0.5% to about 5.0% of sulfuric acid and subsequently heating the acid mixture containing the said complex to a temperature of about 100° C., thereby effecting its decomposition and forming cyclopentane carboxaldehyde.

3. A process for the production of cyclopentane carboxaldehyde which comprises contacting cyclohexene at a temperature of between about 40° C. and about 70° C. with a quantity of a reagent comprising an oxygen-containing mercuric salt in an acid medium having a pH of less than about 4 thereby forming a cyclohexene-mercuric compound addition compound, and subsequently heating the said addition compound at a temperature sufficiently high to effect its decomposition with the formation of cyclopentane carboxaldehyde.

4. A process for the production of trimethylcyclopentane carboxaldehyde which comprises forming a trimethylcyclohexene-mercuric sulfate complex by contacting trimethylcyclohexene with a quantity of mercuric sulfate in an aqueous acid medium containing from about 0.5% to about 5.0% of sulfuric acid at a temperature of between about 55° C. and about 65° C., subsequently decomposing the said complex and forming trimethylcyclopentane carboxaldehyde by heating the said complex in the said aqueous acid medium at a temperature which is substantially equal to the boiling temperature of the latter.

5. A process for the production of trimethylcyclopentane carboxaldehyde which comprises reacting trimethylcyclohexene at a temperature of between about 40° C. and about 70° C. with a reagent comprising an oxygen-containing mercuric salt in an acid medium having a pH of less than about 4, thereby forming a trimethylcyclohexene-mercuric salt addition product, and subsequently heating the said addition product to a temperature of about 100° C. in order to effect its decomposition and form trimethylcyclopentane carboxaldehyde.

6. A process for the continuous production of alicyclic aldehydes which comprises continuously contacting at a reaction temperature between about 20° C. and about 70° C. a stream of a cyclic non-tertiary olefin having more than five cyclic carbon atoms with a quantity of an oxygen-containing salt of mercury, thereby forming the corresponding olefin-mercuric salt complex, continuously withdrawing the said complex from the reaction chamber, and continuously converting the said complex to the desired alicyclic aldehyde by heating it at a temperature between about 90° C. and about 105° C. in a solution of an oxygen acid having a pH of less than about 4.

7. A process for preparing alicyclic aldehydes which comprises forming an olefin-mercuric salt addition compound by reacting a cyclic non-tertiary olefin having more than five carbon atoms in the ring with an oxygen salt of mercury at superatmospheric pressure and at a reaction temperature which is substantially below the decomposition temperature of the said addition compound, and subsequently decomposing the said addition compound by heating it in a medium containing a sufficient amount of an oxygen acid to establish a pH of less than about 4 at a temperature which is substantially equal to the boiling temperature of the reaction mixture.

8. A process for the production of alicyclic aldehydes which comprises reacting a cyclic non-tertiary olefin having more than five nuclear carbon atoms with an oxygen-containing mercuric salt at a temperature between about 20° C. to about 70° C., and subsequently heating the said addition compound in a solution of an oxygen acid having a pH of less than about 4 at a temperature which is substantially equal to the boiling temperature of the latter.

9. A process for the production of alicyclic aldehydes which comprises contacting a cyclic non-tertiary olefin having more than five carbon atoms in its cyclic structure with an aqueous solution of an oxygen-containing mercuric salt at a temperature between about 20° C. and about 70° C. to form an olefin-mercuric salt addition compound, and subsequently heating the said addition compound at a temperature which is substantially equal to the boiling temperature of the reaction mixture.

HARRY LOUIS YALE.
GEORGE W. HEARNE.

REFERENCES CITED

The following references are of record in the file of this patent:

UNITED STATES PATENTS

| Number | Name | Date |
|---|---|---|
| 1,044,169 | Grunstein | Nov. 12, 1912 |
| 2,052,195 | Schneider et al. | Aug. 25, 1936 |
| 2,197,258 | Macallum | Apr. 16, 1940 |
| 2,223,500 | Scott et al. | Dec. 3, 1940 |
| 2,270,705 | Herstein | Jan. 20, 1942 |
| 2,334,091 | Herstein | Nov. 9, 1943 |

FOREIGN PATENTS

| Number | Country | Date |
|---|---|---|
| 339,592 | Great Britain | Dec. 8, 1930 |

OTHER REFERENCES

Willstatter et al., "Ber. Deut. Chem. Ges.," vol. 46, pages 2952 to 2958 (1913); vol. 47, page 2814 (1914).

Kotz et al., J. Prak. Chem. (2), vol. 111, page 383 (1925).